United States Patent Office 3,425,123
Patented Feb. 4, 1969

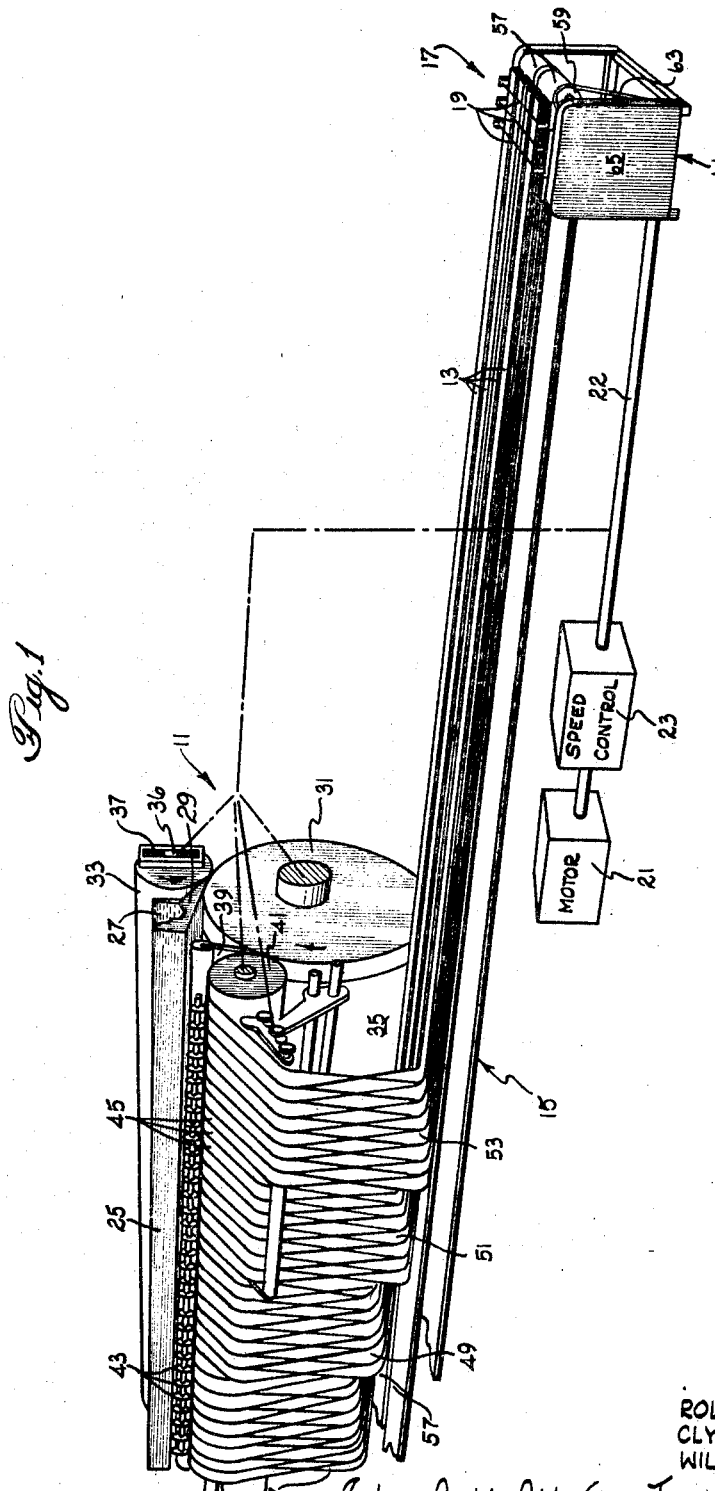

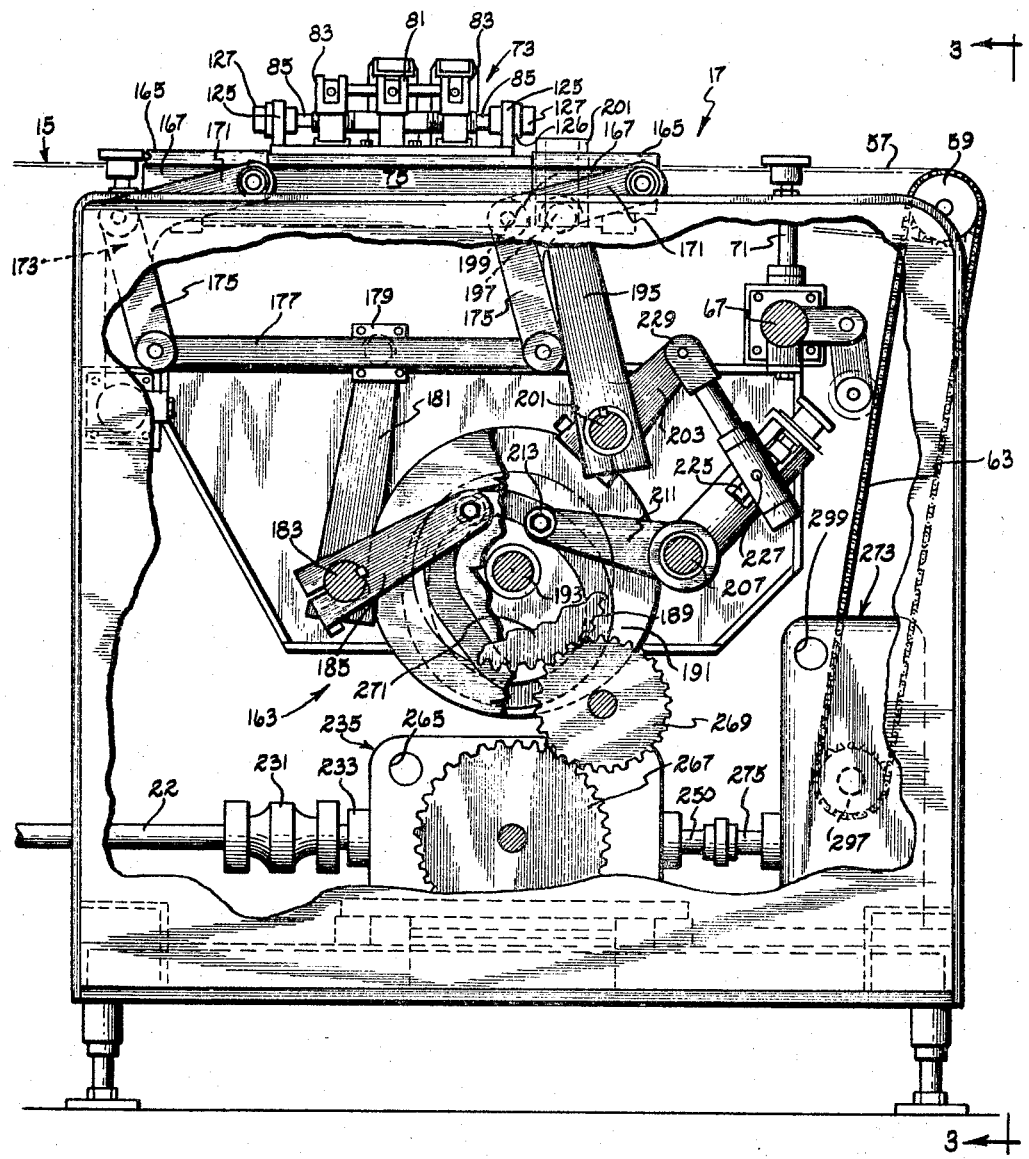

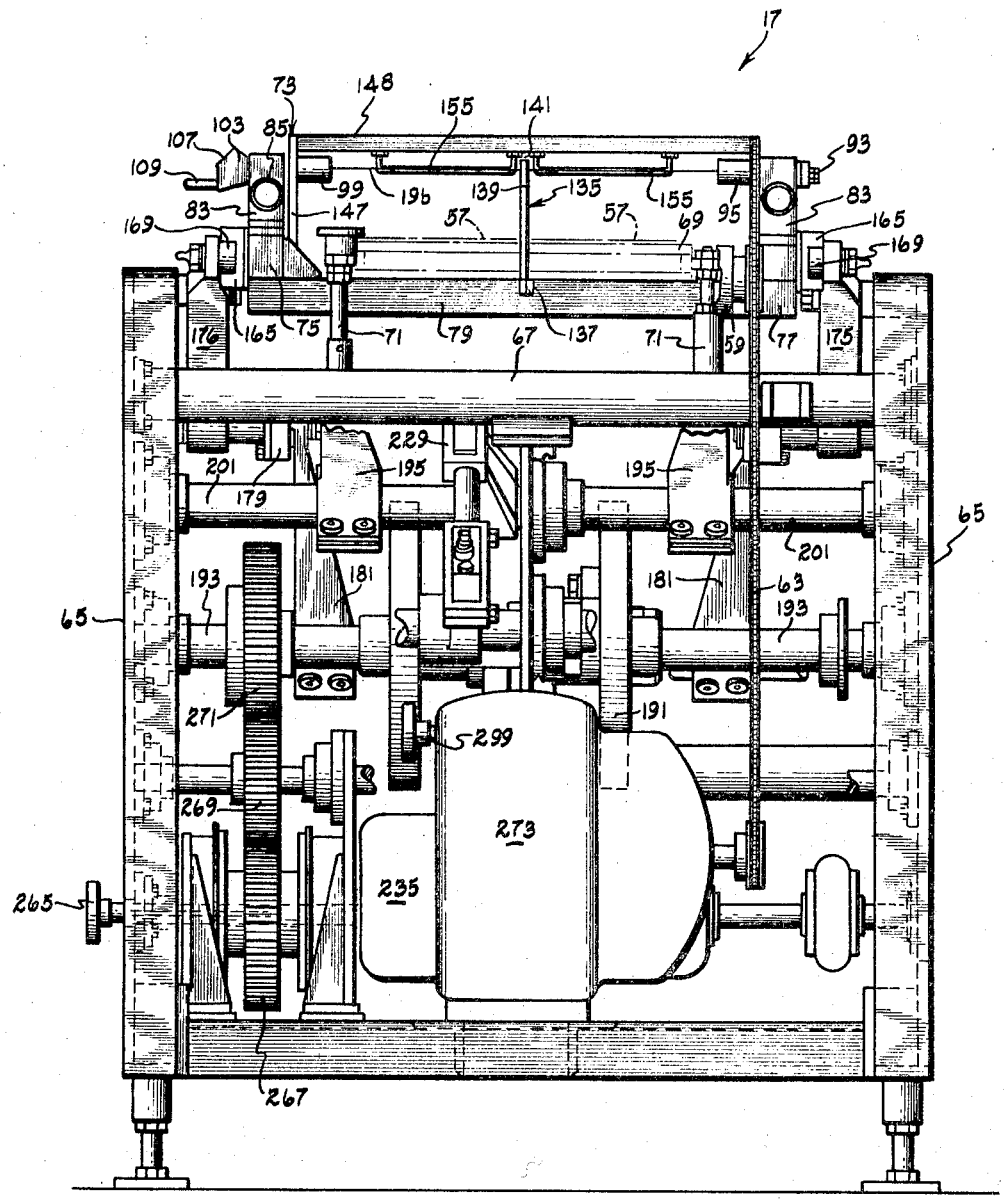

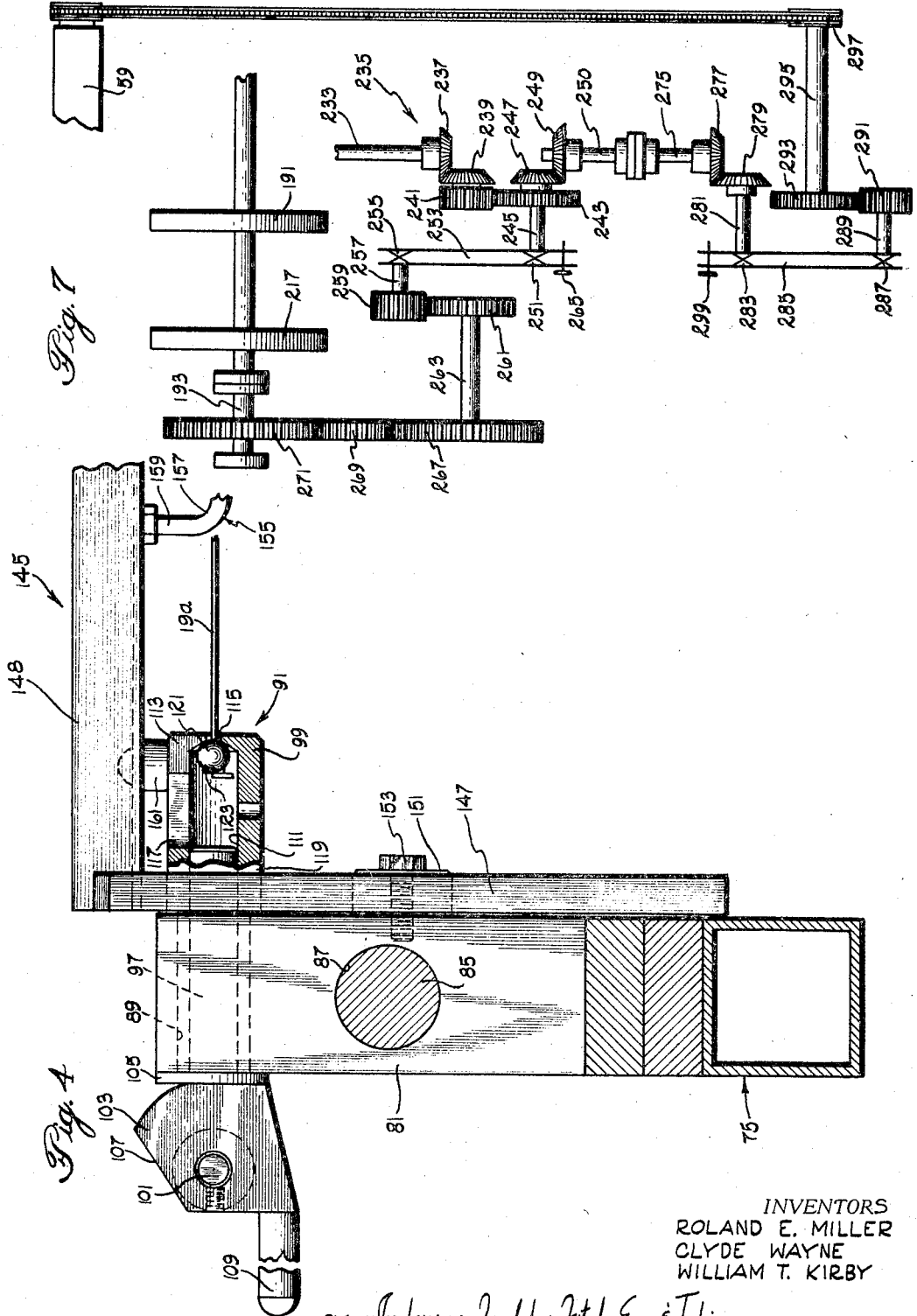

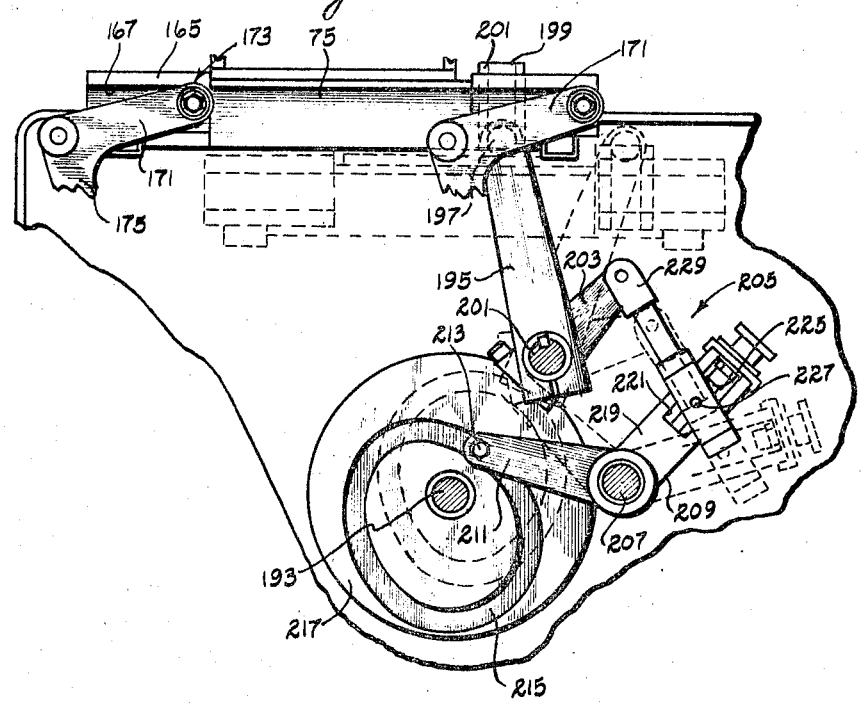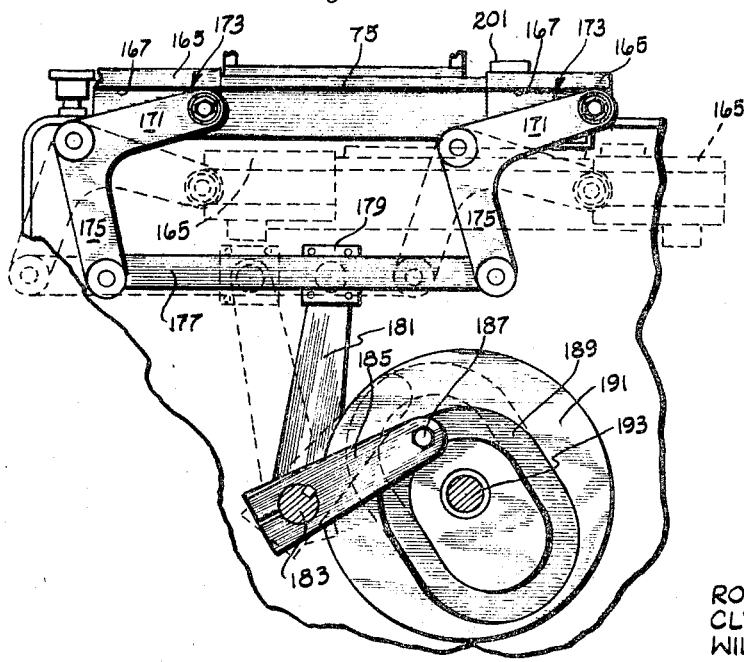

3,425,123
ELONGATED CHEESE RIBBON CUTTING DEVICE
Roland E. Miller, Orangeville, Clyde Wayne, Wilmette, and William T. Kirby, Park Ridge, Ill., assignors to National Dairy Products Corporation, Chicago, Ill., a corporation of Delaware
Filed Apr. 1, 1966, Ser. No. 539,339
U.S. Cl. 31—5                    13 Claims
Int. Cl. A23c *19/14;* A01j *25/00;* B23d *25/02*

This invention relates to methods and apparatus for providing units of a commodity such as cheese for wrapping or other packaging.

In recent years, demand has risen for packages of cheese made up of a stack of slices. To supply this demand in quantity, apparatus of the type disclosed in U.S. Letters Patent No. 2,352,210 has been developed to produce elongated ribbons of cheese which consist of endless strips arranged in superimposed or stacked relation, each strip having the width and thickness of a conventional slice. Preferably, the superimposed ribbons are moved directly from such apparatus to and through a cutting device which automatically cuts each ribbon transversely to divide it into units, each of which consists of a stack of slices. These units are then delivered to a suitable apparatus for packaging.

Governmental regulations require that each package containing a food product be provided with an accurate indication of the weight of its contents. This may be, and frequently is, accomplished by weighing and marking each package individually before distribution to the consumer. However, it is believed preferable from a marketing standpoint to package commodities such as cheese in preprinted packages or in packages having labels which are preprinted. In order for preprinted packages and labels to be practical, it is necessary that a desired weight be selected and that units then be produced in such a manner that their weight closely approximates that selected.

It is also desirable from a packaging standpoint that at least certain dimensions of the units to be packaged be uniform so that it is not necessary for the packaging machinery to accommodate itself to units of various sizes. Uniform size is also desirable when preprinted wrapping material with advertising indicia repeated at preset intervals is used. With such material, a packaged unit of predetermined length and width is contemplated.

In practice, a ribbon of cheese is produced having a predetermined fixed width and provided with such a thickness that a segment of the ribbon of the desired length has the desired weight. It is thus necessary to accurately control the length of the units during the cutting operation in order to achieve both a predetermined weight and a predetermined size. Cutting of the continuously moving ribbon into predetermined lengths involves a consideration of two variables. First, the movement of the cutting instrument must be correlated with the speed of movement of the ribbon. The ribbon speed varies with the type of product, atmospheric conditions, etc. Second, an elongated cheese ribbon is normally under some tension and stretch when it is delivered to the cutting apparatus. As a segment or unit is separated from the ribbon, it tends to "snap back" or shrink. The amount of shrinkage, which varies with the type of cheese, must be taken into consdieration in the operating of the cutting apparatus.

Since both the speed of travel of the ribbon and the degree of snap-back or shrinkage are variable depending upon the type of product and the conditions under which it is produced, it is desirable that provision be made to vary the operation of the cutting apparatus as well. Preferably, adjustments in the operation of the cutting apparatus should be possible while the apparatus is operating so that it will not be necessary to halt production when adjustments are made. Also, it is desirable that the cheese producing apparatus, the conveyor, and the cutting apparatus be linked together in such a manner that the operation of each can be controlled individually and that the operation of all may be controlled jointly, as circumstances dictate.

It is therefore an important object of the present invention to provide an improved apparatus for use in the continuous production of units of food such as cheese.

Another object of the invention is to provide an improved device for controlling the size and weight of individual cheese units produced from ribbons by controlling and correlating the speed of production, the thickness and the speed of travel of the ribbon, and the various movements of a cutting instrument.

A further object of the invention is to provide an accurate means for simultaneously and repetitively separating segments of predetermined length from a continuously moving ribbon of cheese.

Other objects and advantages of the invention will become apparent from the following description when considered in conjunction with the accompanying drawings, in which:

FIGURE 1 is a diagrammatic representation, in perspective, of the overall apparatus for producing cheese strips, arranging them in a stack to form ribbons, and cutting the ribbons into units of predetermined length;

FIGURE 2 is a partially broken away fragmentary elevational view of a cutting apparatus showing various features of the invention;

FIGURE 3 is a fragmentary end view of the apparatus of FIGURE 2 looking in the direction of the arrows 3—3 of that figure;

FIGURE 4 is a fragmentary end elevational view of a portion of the apparatus shown in FIGURES 2 and 3 which carries the cutting instruments;

FIGURE 5 is a fragmentary elevational view showing the mechanism of FIGURE 2 which moves the cutting members vertically;

FIGURE 6 is a fragmentary elevational view showing the mechanism of FIGURE 2 which moves the cutting members longitudinally; and FIGURE 7 is a schematic illustration of the drive mechanism of the apparatus shown in FIGURE 1.

The general arrangement of the food processing apparatus is represented in FIGURE 1 and includes a ribbon forming apparatus, shown diagrammatically and designated generally by the numeral 11, which delivers a plurality of cheese ribbons 13 to a horizontal conveyor 15. The conveyor 15 moves the ribbons to and through a cheese cutting apparatus 17 which includes a plurality of cutting members in the form of wires 19.

The ribbon forming apparatus 11, the conveyor 15 and the cutting apparatus 17 are all driven by a common power source such as an electric motor 21 having an output shaft 22 and, preferably, a speed control 23. The connection between the output shaft 22 of the motor 21 and the ribbon-forming apparatus 11 is shown diagrammatically in FIGURE 1 and may take any suitable form, the details of which are not part of the present invention.

The motor shaft 22 also drives the conveyor 15 and cutting apparatus 17 in a manner hereinafter described. By this arrangement, both the conveyor speed and the movements of the wires are directly correlated with the speed of the ribbon forming apparatus. As a result, a change in the speed of ribbon formation, caused by adjustment of the speed control 23 of the motor 21, will cause a corresponding change in the speed of both the conveyor 15 and cutting apparatus 17.

In order to control the weight of the units produced, provision is made within the ribbon forming apparatus for controlling the thickness of the ribbons as they are produced and, hence, for controlling the weight of the ribbons per unit of length. In addition, provision is made for controlling the speed of the conveyor 15 and the speed of the cutting wires 19 independently of the speed of the ribbon forming apparatus 11 and independently of the speed at which each is operated, all of these adjustments being possible while the system is in operation. Provision is also made for adjusting the distance between each of the wires 19, and for controlling the "squareness" of the cuts made by the wires, i.e., the disposition of the cut surface of a unit relative to the vertical when the top surface of the unit lies in a horizontal plane.

The ribbon forming apparatus 11, as shown in FIGURE 1, is in some respects similar to that disclosed in the aforementioned U.S. Letters Patent No. 2,352,210. As illustrated, the apparatus includes a hopper 25 for receiving a quantity of fluid or molten cheese 27. The hopper 25 is provided with a downwardly inclined elongated outlet spout 29 which delivers the molten cheese into the nip or bright between a drum 31 and a cooperating forming roll 33. The drum 31 and forming roll 33 are adapted to be rotated in opposite directions, as shown by the arrows in FIGURE 1, so that the cheese delivered into the nip or bight from the spout 29 is rolled out between them into a thin sheet 35 which adheres to and follows the drum 31 in its rotation. In order that the thickness of the sheet 35 and, hence, the weight per unit length of the ribbons 13, can be controlled, the position of the forming roll 33 relative to the drum 31 is rendered adjustable so that the gap between the rolls can be controlled. In the illustrated embodiment, this is accomplished by supporting the bearings 36 of the roll 33 by means of a jack screw 37 which when rotated by a motor or other suitable means (not shown) effects raising and lowering of the bearings 36 and, hence, the roll 33.

To solidify the molten cheese, the drum 31 and forming roll 33 are chilled by means of suitable refrigerants, the details of which are not necessary to describe for this invention.

The sheet 35 of cheese travels around the drum 31 and upwardly to a doctor blade 39 which separates the sheet from the drum, permitting it to pass upwardly over the top of a take-off roll 41. A series of slitting disks 43, mounted in cooperative relation to the take-off roll 41, serve to cut the sheet 35 of cheese into parallel ribbons 45 as it is carried over the take-off roll.

The sheet 35 is cut into four sets of ribbons 45, the sets being respectively desginated as 47, 49, 51 and 53. Suitable guide means cause the respective sets to be laid down on the conveyor 15 in transversely spaced relation. As illustrated, each of these sets of ribbons are alike. If desired, the number and width of the ribbons composing each set may be varied. The respective sets of ribbons are then guided to respective predetermined positions on the conveyor 15, which extends parallel to the axis of the drum 31. The ribbons in each set are deposited one on top of the other to provide four stacks of superimposed ribbons.

The conveyor 15 delivers the stacks of ribbons thus formed into the cheese cutting apparatus 17. In the illustrated embodiment, the conveyor 15 comprises a pair of side-by-side conveyor belts 57 (FIGS. 2 and 3) which pass around and are supported at one end by a roll 59 mounted on the frame 61 of the cutting apparatus 17. The belts 57 may be supported at their opposite end by a similar roll (not shown) and intermediate their ends by plates or rollers (not shown). The belts are driven by the roll 59 which is drivingly connected to the shaft 22 of the motor 21 via a roller chain 63 which passes around suitable sprockets as hereinafter described. Preferably, the conveyor belts 57 are driven at a speed which will cause minimum stretch of the ribbons without affecting ribbon handling.

Referring now more specifically to the improved cheese cutting apparatus 17, the frame 61 is of a generally rectangular shape and includes generally vertical side walls 65 maintained in horizontally spaced relation by suitable cross braces including an upper cross brace 67 (FIG. 3) adjacent the delivery end of the apparatus. The conveyor supporting and driving roll 59 is suitably journalled adjacent the delivery end of the apparatus. A conveyor supporting table 69 is supported on threaded posts 71 which extend upwardly from the upper cross brace 67 and is adjustably secured to the posts so as to permit it to be positioned with its upper surface immediately below the upper run of the conveyor belts 57 in supporting relation thereto.

The cutting wires 19 are mounted on a movable carriage 73 (FIGS. 2-6) which include two elongated side bars 75 and 77, each of which is positioned in outwardly spaced relation to a side edge of the conveyor. The side bars are joined by cross braces 79 (FIG. 3) positioned below the belts. Three cutting wires 19 are provided, namely, a center wire 19a which is maintained in a stationary position relative to the carriage 73, and a pair of flanking wires 19b and 19c which are mounted on the carriage so that their positions relative to the center wire can be adjusted. Thus, the spacing between the wires can be varied and the length of that portion of the ribbon cut by adjacent wires can be controlled.

The center wire 19a is supported at each end by a center post 81 (FIG. 2), one of which extends upwardly from and is fixedly mounted on each side bar 75 and 77. The flanking wires 19b and 19c are supported at opposite ends by movable posts 83 (FIGS. 2 and 3) which rest on the side bars but are supported by adjusting shafts 85, soon to be described.

Each center post 81 is provided with a horizontally disposed hole 87 (FIG. 4) which extends therethrough in parallel relation to the side bars 75 and 77 about midway of the height of the post. One end of each adjusting bar 85 is rotatably journalled in the hole 87, which may be lined to provide a bearing if desired. Adjacent its upper end, each center post is provided with a second hole 89 which extends transversely through the post and receives a portion of the wire supporting assembly 91, hereinafter described.

The wire supporting assembly 91, which is herein described with reference to the center wire 19a but which is identical for the wires 19b and 19c, includes a take-up shaft carried in each of the holes 89 adjacent the upper end of the center post 81. A take-up shaft 93 supported by the post of the side bar 77 (the right side in FIGURE 3) has a threaded outer end which receives suitable washers and nuts to prevent its withdrawal inwardly through the hole 89. The opposite end of the take-up shaft 93 carries a wire holder 95.

The take-up shaft 97 carried by the opposite center post (FIG. 4) has a wire holder 99 mounted on its inner end and is provided with a transverse hole at its outer end which receives a pin 101 by means of which a camming plate 103 is pivotally mounted on it. The camming plate includes a flat edge surface which engages a bearing plate 105 interposed between the camming plate 103 and the outer surface of the post when the wire 19a is taut. It also includes a surface 107 inclined relative to the flat edge surface and in closer proximity to the pivot pin 101. When the camming plate 103 is rotated so as to bring the surface 107 into engagement with the bearing plate 105, the pin 101 is thus disposed closer to the post 81, thereby relaxing the tension on the wire and permitting its removal, as for replacement purposes. Pivotal movement of the camming plate 103 is facilitated by a handle 109.

The wire holders 95 and 99, as best shown by the illustration of the holder 99 in FIGURE 4, are of a generally cylindrical construction and comprise a central longitudinally extending bore 111 which terminates short of an end wall 113. An aperture 115 extends through the end wall into communication with the bore 111, and a slot 117 is provided in the top wall of the holder, also in communication with the bore, and is connected with the aperture 115 by a slit of sufficient diameter to pass the wire 19. A hole 119 extends vertically through both the top and bottom walls of the holder to receive a pin which also passes through a hole in the take-up shaft 93 or 97, thus securing the holder to the shaft.

One end of the wire is retained within the bore 111 of the wire holder of each center post and, in this regard, has a ball 121 and keeper plate 123 provided at each end. The ball 121 is of a lesser diameter than the bore 111 and slot 117, and of a greater diameter than the aperture 115. The wire passes through a hole in the ball and in the keeper plate and is bent so as to retain the ball on the wire.

In inserting a wire in the apparatus, the camming plate 103 is rotated so as to move the wire holder connected thereto inwardly. A ball 121 at each end of the wire is then inserted into the bore 111 through the slot 117 of an adjacent wire holder. The camming plate 103 is again rotated, drawing the wire taut. In removing a wire, the reverse of this procedure is employed.

As previously mentioned, wires 19b and 19c are supported by movable posts 83 which are carried on adjusting shafts 85. One end of each adjusting shaft of each pair is journalled in the hole 87 of a center post 81 (FIG. 2) while the other end of each is of reduced diameter and is rotatably journalled in a suitable hole in a bracket 125 which extends upwardly adjacent each end of each side bar 75 and 77. Collars 126 are secured to the adjusting shafts 85 adjacent each side of its respective bracket to prevent axial movement thereof, and an adjusting knob 127 is provided at each end of the adjusting shaft adjacent a bracket 125 provided with suitable calibration markings which indicate the positions of the wires 19b and 19c.

The adjusting bars 85 are threaded for a portion of their length inwardly from the reduced necks thereof and are received within a threaded hole provided in each movable post 83. The movable posts are otherwise similar to the fixed center post 81 in that they include a transverse hole adjacent their upper end to receive a take-up shaft 97. At their lower ends, however, each movable post is provided with a foot (not shown) which rides in a groove (not shown) formed in the upper surface of each of the side bars 75 and 77.

As the bars 85 are rotated, the wires 19b and 19c are moved toward or away from the center wire 19a. Thus, the position of each of these two wires may be adjusted relative to the center wire. This feature permits a fine adjustment of the length of the units being cut without changing the weight per unit length of the ribbons and is particularly useful in making fine adjustments for snap-back or shrinkage of the units cut.

The cutting apparatus cuts four ribbons of cheese simultaneously and thus, during the cutting, each wire spans the four ribbons. In order to support the wires so as to reduce the overall span during cutting, a supporting frame 135 is provided (FIG. 3). The frame 135 is of a generally rectangular open construction and includes a bottom leg 137 extending generally horizontally and secured to the cross braces 79 centrally thereof. Arms 139 extend upwardly from the bottom leg 137 and are interconnected adjacent their upper ends by a support bar 141 which rests on the upper edge of the wires and which is provided with three notches (not shown) along its lower edge to receive the wires.

Occasionally in the operation of the cheese cutting apparatus where the ribbons are formed of stacks of relatively thin strips, the uppermost strip or strips of the stack may tend to adhere to and rise with the wires 19 as the wires leave the ribbon, thus destroying the regular configuration of the unit produced. The problem may be of particular concern with respect to the two wires making the forwardmost cuts and less critical with respect to the rear wire since the top slice behind this wire is part of a long continuous strip. To eliminate such a problem, a stripping assembly 145 is provided for each of the two forwardmost wires. It may be provided for the rearwardmost wire if desired or deemed necessary.

Each stripping assembly 145 (FIGURE 4) includes vertical legs 147 connected by a top cross bar 148. The legs 147 of one assembly 145 are positioned adjacent the inner surface of each center post 81, while the legs 147 of a second assembly are positioned adjacent the inner surface of the forwardmost of the movable posts 83. Each leg 147 is bifurcated so as to include a pair of horizontally spaced sections connected at their upper ends and defining a vertical slot (not shown) therebetween. Each vertical slot receives one of the wire holders 95 or 99 adjacent its upper end and a roller 151 adjacent its lower end, the roller 151 being rotatably mounted on a bolt 153 threaded into the post 81 or 83. Thus, the legs are not fixed to the posts 81 or 83. Rather, the presence of the workholders and rollers within the slots 149 permit and guide relative movement between the posts and legs.

The cross bar 148 of each stripper assembly 145 carries two depending sets of parallel hold down rods 155. Each set comprises two rods arranged in a row parallel to the direction of travel of the ribbon to be cut and with each rod being generally of U-shaped configuration so as to include a base segment 157 supported by a pair of arms 159. Each set overhangs one of the conveyor belts 57 and the bases thereof are of sufficient width to span both ribbons supported on the belt. Each cross bar 148 carries on its lower face a button or pad 161 adjacent each of its ends and so positioned that its head engages the upper surface of the adjacent wire holder 95 or 99 when the stripper is in its uppermost position relative to the carriage 73. Engagement of the pads 161 with the wire holder limits relative movement between the stripper assembly and the remainder of the carriage in one direction. The pads are formed of a suitable material such as neoprene which will produce minimal noise upon engagement.

In the operation of a stripper assembly 145, when the cutter carriage is in its highest position, the stripper assembly is supported by the engagement between the wire holders 95 and 99 and the pads 161. As the carriage moves downward, the stripper assemblies follow until the hold down rods 155 come into contact with the ribbons 13. After such engagement, the hold down bars rest upon the ribbon while the wires continue in a downward direction to cut the ribbon and, more important, as the wires rise upwardly out of the ribbon. During the latter movement of the wires, the rods hold down the top slice until the wire 19 is disengaged from the ribbon.

Referring now to the movement of the cutting apparatus 17 when the apparatus is in operation, the carriage is moved so as to cause the wires 19 to enter and move downwardly to cut the ribbons while traveling forwardly therewith, to move upwardly out of the ribbons while traveling forwardly therewith, and to move rearwardly in a direction opposite to that in which the ribbons are traveling to a point at which the cycle is repeated. This movement is accomplished by a drive mechanism 163, hereinafter described, by means of which these movements can be controlled and altered, so as to vary the size of the units produced, while the apparatus is operating. In general, the mechanism 163 includes means for effecting vertically reciprocal movement of the carriage 73, and further means for at the same time effecting horizontal reciprocal movement of the carriage.

More specifically, and with respect to vertical movement of the carriage 73, each side bar 75 and 77 has a slide plate 165 (FIGS. 2, 3 and 5) mounted adjacent each of its ends. Each slide plate defines a guide channel 167 which receives a roller 169 (FIG. 3) carried at the outer end of an arm 171 of a rocker 173 (FIG. 5). The guide channel 167 is of sufficient length to permit significant movement of the carriage relative to the rockers. Four rockers are provided, two adjacent each side of the carriage located in horizontally spaced relation. The rockers are pivotally mounted on the frame 61 of the apparatus and, upon rotation or pivotal movement, effect raising and lowering of the carriage. However, by virtue of the guide channel and roller connection between the rockers and carriage, the carriage can be moved horizontally relative to the rockers.

The opposite arm 175 of each rocker is pivotally mounted on one end of a connecting rod 177 such that the arms 175 of each set of rockers are interconnected. Each connecting rod 177 carries a plate 179 intermediate its ends which is pivotally attached to the upper end of a vertical drive arm 181 which extends downwardly and is keyed to a transverse shaft 183. The shaft 183 also has keyed to it one end of a pivot arm 185 provided with a cam follower 187 at the opposite end which rides in a suitably shaped cam channel 189 provided in a cam disk 191. The cam disk is suitably rotatably mounted on a cam shaft 193 journalled in the frame 61 and connected to the carriage drive by means to be described below.

The cam channel 189 is so shaped in relation to the dimensions of the various members of the vertical movement system that the cam follower 187 oscillates so as to cause rocking of the shaft 183 and, hence, of the drive arm 181. This rocking of the drive arm causes pivotal movement of the rockers 173 and, hence, vertical oscillating movement of the carriage 73.

As the carriage is raised and lowered, it is also caused to move horizontally on the upper ends of the rocker arms 171, such movement being possible by virtue of the rollers 169 which are mounted at the ends of the rocker arms 171 and which occupy the guide channels 167 on the carriage. Such movement is effected by a pair of drive arms 195, (FIGS. 3 and 6) each of which is provided with a roller 197 at its upper end which is received within a vertical guide channel 199 defined by a plate 201 secured to the forward end of the carriage. Each drive arm is keyed at its lower end to a transverse shaft 201 rotatably mounted on the frame 61. A clamp arm 203 is also affixed to the transverse shaft 201 such that rocking motion of the clamp arm 203 causes rocking motion of the drive arms 195 and, hence, forward and rearward movement of the carriage 73.

The rocking movement of the clamp arm directly affects the rate at which the carriage moves forward as it is moved downward by the rocking movement of the rockers 173 and, thus, directly affects the cutting path traced by the wires in the moving ribbons 13. This rocking motion is accomplished by a mechanism 205 which is adjustable so that the nature of the cut of the wires can be controlled and a "square" cut provided.

The mechanism 205 comprises a transverse shaft 207 on which is pivotally mounted an adjustment arm in the form of a bell crank 209. One arm 211 of the bell crank 209 is provided with a cam follower 213 which rides in the cam track 215 of a cam disk 217 mounted on the cam shaft 193, the cam track being of such design as to cause a predetermined rocking movement of the bell crank.

The opposite arm 219 of the bell crank is provided with a slot 221 within which a block (not shown) is slidably disposed. The block includes a threaded hole which receives an adjusting bolt 225 extending longitudinally of the slot and rotatably journalled in the outer end of the arm.

Thus, rotation of the bolt 225 causes the block to travel longitudinally of the slot. The block is provided with a trunnion 227 at each end, each trunnion being received within one of a pair of holes provided in opposing walls of the hollow end of a link 229 which encircles the block 223. The opposite end of this link is pivotally connected to the end of the clamp arm 203. Thus, rocking of the bell crank 209 is transmitted to the clamp arm 203. However, rotation of the bolt 225 alters the effective length of the arm 219 of the bell crank and, thus, alters the stroke of the drive arms 195 and horizontal movement of the carriage 73.

Reviewing briefly the operation of the carriage drive, rotation of the cam shaft 193 effects rocking movement of the rockers 173. This movement causes the carriage to be alternately raised and lowered. At the same time, rotation of the cam shaft 193 also causes rocking of the bell crank 209 which produces a rocking movement of the drive arms 195, thereby causing horizontal reciprocal movement of the carriage. The cam tracks in the cam disks are so shaped that the combined effect of the vertical and horizontal movement is a downward and forward movement of the cutting wires in the cutting stroke, an upward and forward movement of the wires in the withdrawal stroke, and a generally horizontal rearward movement of the wires (with essentially no vertical movement) in the return stroke. The wires thus move forwardly with the ribbon when in the ribbon, and move rapidly back to their original position when out of the ribbon.

As previously mentioned, the ribbon forming apparatus 11, the conveyor 15, and the carriage 73 are all driven in common by the motor 21. As can be seen in FIGURE 1, the motor drives the output shaft 22 from which power for the ribbon forming apparatus 11 is taken. The shaft 24 extends to the cutting apparatus 17 where, as can be seen in FIGURE 2, power is taken to drive the conveyor 15 and carriage 73. However, since correlation between the speeds of the various units is of considerable importance, adjustment is provided so that the system may be initially synchronized.

More specifically, the shaft 22 is connected through a universal joint 231 to the input shaft 233 of a variable speed drive unit 235 shown diagrammatically in FIGURE 7. The input shaft 233 has a miter gear 237 affixed to it which meshes with a miter gear 239 mounted on a common shaft with a helical gear 241. The gear 241 is in meshing engagement with a second helical gear 243 mounted on a shaft 245 which carries a miter gear 247 driving a miter gear 249 mounted on an output shaft 250 of the drive unit 235. The shaft 245 also drives a conical variable pitch wheel 251 connected by a chain 253 to a second conical wheel 255 mounted on a shaft 257 which carries a helical gear 259. The gear 259 meshes with a helical gear 261 mounted on a second output shaft 263 of the unit. An adjusting knob 265 is provided on the unit to vary the pitch of the conical wheels 251 and 255 and, thus, vary the speed of the output shaft 263.

The output shaft 263 of the unit 235 has mounted on it a drive gear 267 which meshes with a smaller gear 269 which, in turn, meshes with a gear 271 mounted on the cam shaft 193. Thus, the motor drive shaft 24 drives the cam shaft 193 and, accordingly, the carriage 73. However, the speed for rotation of the cam shaft can be varied by the adjusting knob 265. If the speed of the conveyor is allowed to remain constant, varying the speed of the cam shaft will cause a larger or smaller unit to be cut between the trailing wire 19c on one cut and the lead wire 19b on the following cut since a greater or lesser length of ribbon will pass beneath the wires while the carriage undergoes its return stroke.

The conveyor 15 is also driven by the motor shaft 22 through a second variable speed drive unit 273 driven through the first variable speed drive unit 235. More specifically, the first output shaft 250 of the unit 235 is coupled directly to a shaft 275 of the second unit 273.

The shaft 275 carries a miter gear 277 which meshes with a miter gear 279 carried on a shaft 281. A variable pitch conical wheel 283 is mounted on the shaft 281 and is connected through a chain 285 to a similar wheel 287 mounted on a shaft 289. The shaft 289 also carries a helical gear 291 which meshes with a helical gear 293 on an output shaft 295 which carries a sprocket 297. The sprocket 297 receives the roller chain 63 of the conveyor roll 59. A knob 299 is provided to effect adjustment of the conical wheels 283 and 287 and, hence, to alter the speed of the output shaft 295.

It is to be noted that, although the motor drive shaft 22 drives both the cam shaft 193 and the conveyor roll 59, the speed of each can be adjusted independently of the other. Thus, the speed of the cam shaft 193 can be varied relative to the speed of the conveyor to alter the length of the units being produced. However, changing the speed of the motor 23 to alter the operation of the ribbon forming apparatus automatically alters the speed of both the cam shaft 193 and the conveyor 15 to the same degree. Hence, in such an event the size of the slices produced is unaffected.

In the operation of the overall system, the motor is set to drive the ribbon forming apparatus at a predetermined desired speed. The screw jack 37 is then adjusted to provide a gap between the drum 31 and forming roll 33 such as will impart to the sheet 35 a thickness which will cause a predetermined length of ribbon of stacked strips, e.g., 10½ or 3½ inches of ribbon, to have a desired weight, e.g., 24 or 8 ounces. The speed of the conveyor 15 is then adjusted by means of the knob 299 to provide an ideal rate of removal of the ribbons as they are formed while causing minimum stretch of the ribbons. During the adjustment the cutter may be rendered inoperable, as by disengaging a clutch (not shown).

When the desired speed of the conveyor is reached relative to the ribbon forming apparatus, the cutting apparatus is engaged and its speed adjusted by means of the knob 265 until the lead wire 19b makes cuts a predetermined distance apart, e.g., 10½ inches for certain commercial cheese units. The distance between the individual wires (if more than one wire is used) is then adjusted so that the segment cut by the lead wire will be divided into units equal in size. The adjustable mechanism 205 is then adjusted to insure that the cut being made is square. Samples of the units are then taken and measured to determine how close each unit comes to the desired size. Adjustment of the stroke of the cutter by means of the knob 265 is made if the units are not of the desired length as, for example, if the snap-back or shrinkage was not correctly estimated. Adjustment of the positions of the wires 19 relative to each other may also be necessary. When the desired length has been achieved, the units are weighed to determine how close each comes to the desired weight. If the units are over or under weight, adjustment is made at the screw jack 37 of the ribbon forming apparatus to increase or decrease the thickness of the sheet 35 as it is formed.

It should be appreciated that all of the adjustments contribute to the overall desired size and weight control. The screw jack 37 of the ribbon forming apparatus controls the thickness of the sheet and, hence, the weight per unit length of the ribbons being cut. The control of the speed of the conveyor permits satisfactory removal of the ribbons as they are formed. The control of the speed of the cam shaft 193 permits the speed of the carriage to be correlated with the speed of the conveyor. The adjustment of the mechanism 205 permits control of the squareness of the cut and the adjustment of the distance between the wires insures uniformity of size and weight. Yet, when all of the components of the system are properly adjusted, the speed of all can be changed simultaneously by virtue of the speed control 23 of the motor 21.

Various modifications of the system may, of course, be made without departing from the invention. For example, only one fixed wire may be used rather than the illustrated three wires. The ribbons cut can be varied in height and number of slices, and the number of ribbons can be varied as desired without departing from the scope of the invention.

What is claimed is:

1. A system for producing units from an elongated ribbon by cutting the ribbon into lengths, said system comprising a conveyor for continuously advancing the ribbon at a predetermined speed and in a given direction; an instrument for cutting the ribbon; means for causing said cutting instrument to undergo cyclic movement including a cutting stroke wherein said cutting instrument is moved from an initial position into the ribbon while advancing with the ribbon, a withdrawal stroke wherein said cutting instrument is withdrawn from the ribbon while advancing therewith, and a return stroke wherein said cutting instrument is moved in a direction opposite to that of the ribbon in returning to said initial position; and control means for altering the relationship between the time period elapsing between the end of said withdrawal stroke and the commencement of the immediately succeeding cutting stroke and the speed of movement of said conveyor while said conveyor and cutting instrument are in motion so as to alter the length of the units cut.

2. A system in accordance with claim 1 wherein said control means includes means for varying the speed of said conveyor relative to the speed of said cutting instrument.

3. A system in accordance with claim 2 wherein said control means includes means for varying the speed of said cutting instrument relative to the speed of said conveyor.

4. A system in accordance with claim 2 wherein an apparatus is provided for continuously producing the ribbon, said apparatus including means for varying the weight of the ribbon per unit length.

5. A system in accordance with claim 2 wherein said means for causing said cutting instrument to undergo cyclic movement includes means for altering the speed of movement of said cutting instrument relative to said conveyor during the cutting and withdrawal strokes so as to permit control over the angle of the cut relative to a plane surface of the unit.

6. A system in accordance with claim 2 wherein said cutting instrument includes at least two wires, at least one of which is movable relative to the other to permit control over the length of a unit formed as a result of cuts made simultaneously by said two wires.

7. An apparatus in accordance with claim 6 wherein each wire is provided with an enlargement at each of its ends, wherein each enlargement is received within a holder, wherein means are provided for effecting relative movement of said holders in opposite directions to draw the wire taut, and wherein means are provided for locking the wire holders in a position in which the wires are taut.

8. An apparatus for cutting a continuously moving ribbon into units, said apparatus comprising a carriage having a cutting instrument mounted thereon, first means engageable with said carriage effective to cause reciprocal movement thereof in one direction, said engagement being such as to permit shifting of said carriage relative to said first means, and second means engageable with said carriage effective to cause shifting reciprocal movement thereof in a direction transverse to said one direction during reciprocal movement by said first means in said one direction.

9. An apparatus in accordance with claim 8 wherein a pin and slot connection is provided between said carriage and said first means.

10. An apparatus in accordance with claim 8 wherein said first means includes a link provided with a roller and wherein said carriage defines a channel received by said roller.

11. An apparatus in accordance with claim 8 wherein said first means effects generally vertical reciprocal movement and said second means effects generally horizontal reciprocal movement.

12. An apparatus in accordance with claim 11 wherein means are provided for selectively varying the extent of said horizontal reciprocal movement of said carriage so as to permit control of the angle of the cut surface with respect to the vertical.

13. An apparatus in accordance with claim 11 wherein said second means includes a link, means for causing rocking movement of said link, means effecting engagement between said link and said carriage, and means for selectively varying the effective length of said link so as to vary the extent of the horizontal reciprocal movement of said carriage.

References Cited

UNITED STATES PATENTS

| | | | |
|---|---|---|---|
| 1,620,546 | 3/1927 | Grover | 83—327 X |
| 1,913,153 | 6/1933 | De Salardi | 83—328 X |
| 1,989,012 | 1/1935 | Kalko | 83—328 |
| 2,352,210 | 6/1944 | Kraft | 99—115 |
| 2,907,109 | 10/1959 | Palmer | 31—14 |
| 2,925,269 | 2/1960 | Hensgen et al. | 31—89 X |
| 3,121,361 | 2/1964 | Kramer | 83—327 X |
| 3,267,785 | 8/1966 | Pferdekamper | 83—310 |
| 3,333,495 | 8/1967 | Stuchbery et al. | 83—135 |

ALDRICH F. MEDBERY, *Primary Examiner.*

U.S. Cl. X.R.

31—23; 83—327; 99—115, 243

Dedication 3,425,123.—*Roland E. Miller*, Orangeville, *Clyde Wayne*, Wilmette, and *William T. Kirby*, Park Ridge, Ill. ELONGATED CHEESE RIBBON CUTTING DEVICE. Patent dated Feb. 4, 1969. Dedication filed Oct. 22, 1971, by the assignee, *Kraftco Corporation*.

Hereby dedicates to the Public the entire term of said patent.

[*Official Gazette December 21, 1971.*]